(12) United States Patent
Ballam et al.

(10) Patent No.: US 9,963,102 B1
(45) Date of Patent: May 8, 2018

(54) TOP FILL CURTAIN AIRBAGS

(71) Applicant: Autoliv ASP, Inc., Ogden, UT (US)

(72) Inventors: David Oral Ballam, Wellsville, UT (US); Paul Douglas Hicken, Syracuse, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days. days.

(21) Appl. No.: 15/297,012

(22) Filed: Oct. 18, 2016

(51) Int. Cl.
| | |
|---|---|
| *B60R 21/262* | (2011.01) |
| *B60R 21/232* | (2011.01) |
| *B60R 21/213* | (2011.01) |
| *B60R 21/235* | (2006.01) |
| *B60R 21/237* | (2006.01) |
| *B60R 21/00* | (2006.01) |
| *B60R 21/02* | (2006.01) |

(52) U.S. Cl.
CPC .......... *B60R 21/262* (2013.01); *B60R 21/213* (2013.01); *B60R 21/232* (2013.01); *B60R 21/235* (2013.01); *B60R 21/237* (2013.01); *B60R 2021/0006* (2013.01); *B60R 2021/0018* (2013.01); *B60R 2021/0048* (2013.01); *B60R 2021/028* (2013.01); *B60R 2021/23509* (2013.01); *B60R 2021/23547* (2013.01)

(58) Field of Classification Search
CPC ... B60R 21/262; B60R 21/213; B60R 21/232; B60R 21/235; B60R 21/237; B60R 2021/0006; B60R 2021/0018; B60R 2021/0048; B60R 2021/028; B60R 2021/23509; B60R 2021/23547
See application file for complete search history.

(56) References Cited

U.S. PATENT DOCUMENTS

| | | | |
|---|---|---|---|
| 6,338,498 B1 * | 1/2002 | Niederman | B60R 21/213 280/728.2 |
| 6,428,037 B1 * | 8/2002 | Bakhsh | B60R 21/232 280/729 |
| 6,431,587 B1 * | 8/2002 | O'Docherty | B60R 21/232 280/729 |
| 6,481,743 B1 * | 11/2002 | Tobe | B60R 21/232 280/728.2 |
| 7,967,332 B2 | 6/2011 | Karlsson | |
| 8,585,080 B2 | 11/2013 | Trevena et al. | |
| 8,882,139 B2 * | 11/2014 | Kawamura | B60R 21/213 280/730.2 |
| 2006/0157958 A1 * | 7/2006 | Heudorfer | B60R 21/232 280/730.2 |
| 2007/0296189 A1 * | 12/2007 | Berntsson | B60R 21/213 280/730.2 |

\* cited by examiner

*Primary Examiner* — Drew J Brown
(74) *Attorney, Agent, or Firm* — Stoel Rives, LLP

(57) ABSTRACT

Inflatable curtain airbags and airbag assemblies are provided that can provide for top filling. The inflatable curtain airbag can include a top fill tube and one or more cushion segments. The top fill tube can extend at or adjacent an upper edge of the one or more cushion segments and the top fill tube can direct inflation gas from an inflator to the one or more cushion segments via channels or passages disposed away from one or more occupant receiving areas. The inflatable curtain airbags can also include one or more attachment areas disposed at or adjacent the upper edge of the one or more cushion segments. Mounting tabs may be coupled to the attachment areas and the mounting tabs may be used for installation of the inflatable curtain airbag in a vehicle.

22 Claims, 11 Drawing Sheets

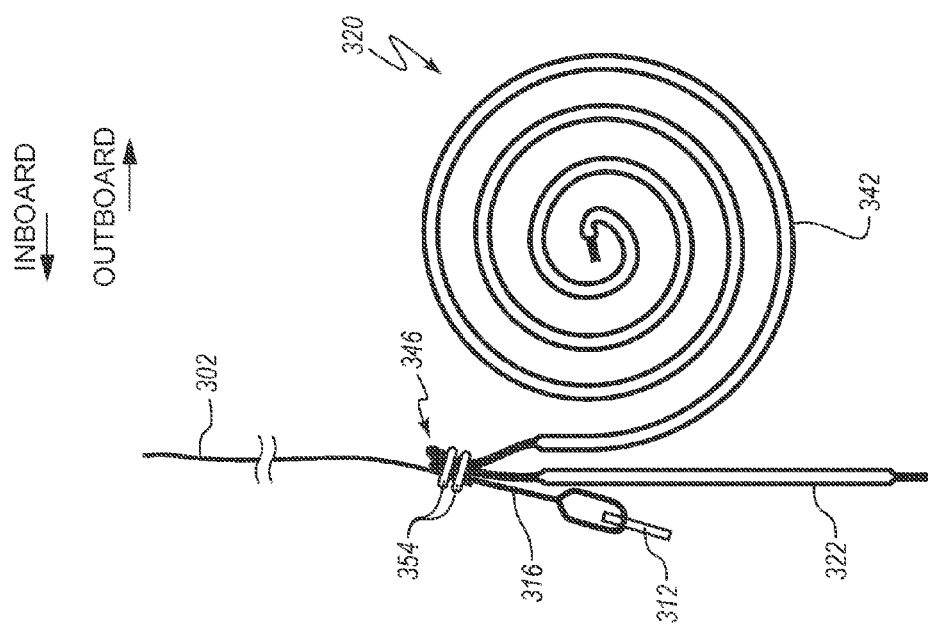
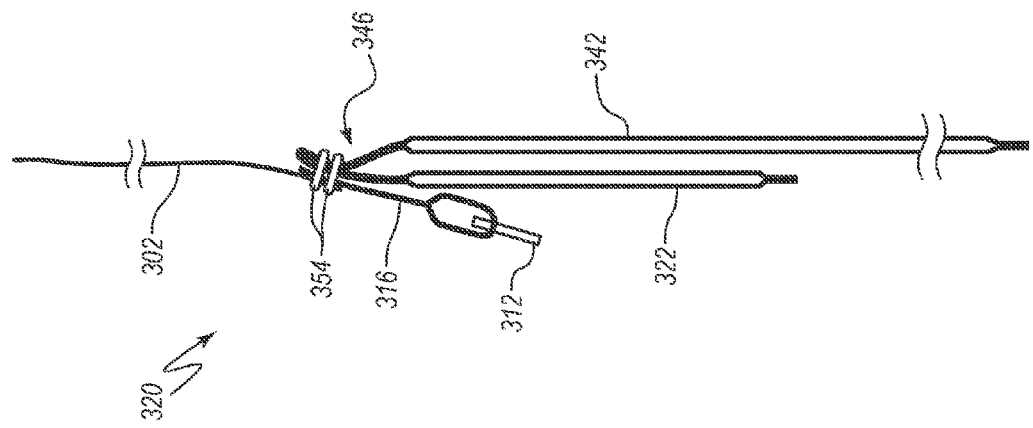

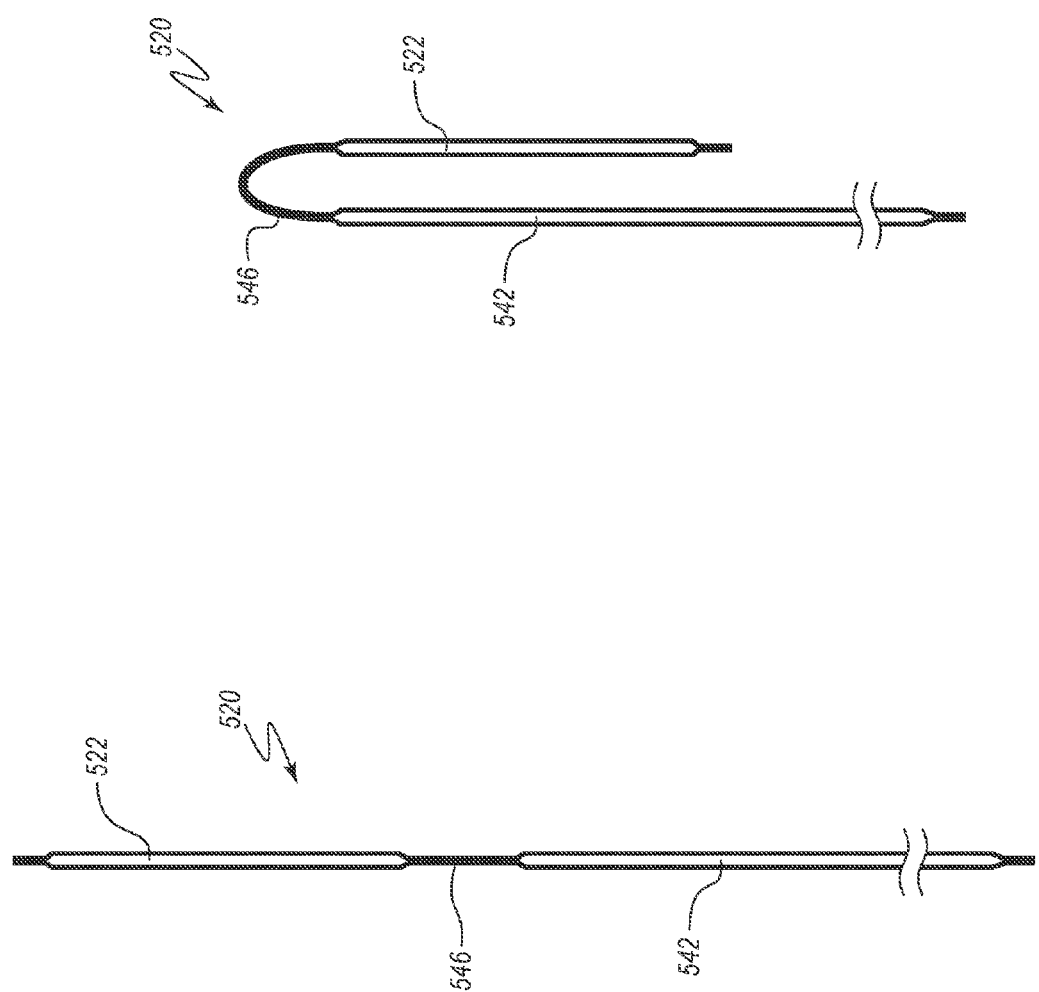

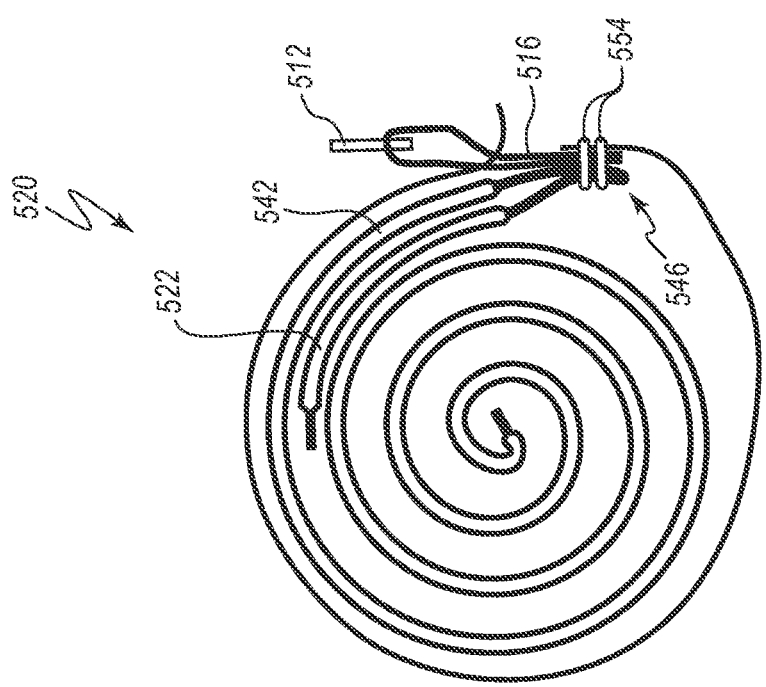

TOP FILL CURTAIN AIRBAGS

TECHNICAL FIELD

The present disclosure relates generally to the field of automotive protective systems. More specifically, the present disclosure relates to inflatable airbag cushion assemblies.

BACKGROUND

Airbags are often mounted to a vehicle and deploy so as to prevent an occupant from impacting vehicular structures and/or to prevent an occupant from being ejected from a vehicle in a collision or roll-over. Inflatable chamber arrangements and configurations of the airbags can be used to direct inflation gas to fill one or more inflatable chambers to control one or more aspects of an airbag deployment. In some instances, the airbags can suffer from one or more drawbacks or may perform less than optimally in one or more respects. Embodiments disclosed herein provide improvement in performance of curtain airbags.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 3C is a cross-sectional view of the inflatable curtain airbag of FIG. 3A shown during packaging and illustrating the attachment of a mounting tab to an attachment area of the inflatable curtain airbag;

FIG. 3D is a cross-sectional view of the inflatable curtain airbag of FIG. 3A shown as being rolled outboard during packaging;

FIG. 5A is a cross-sectional view of an inflatable curtain airbag, according to one embodiment;

FIG. 5B is the inflatable curtain airbag of FIG. 5A with the top fill tube folded outboard;

FIG. 5E is a cross-sectional view of an inflatable curtain airbag, according to one embodiment, shown in a packaged configuration.

DESCRIPTION

Figure 1A:
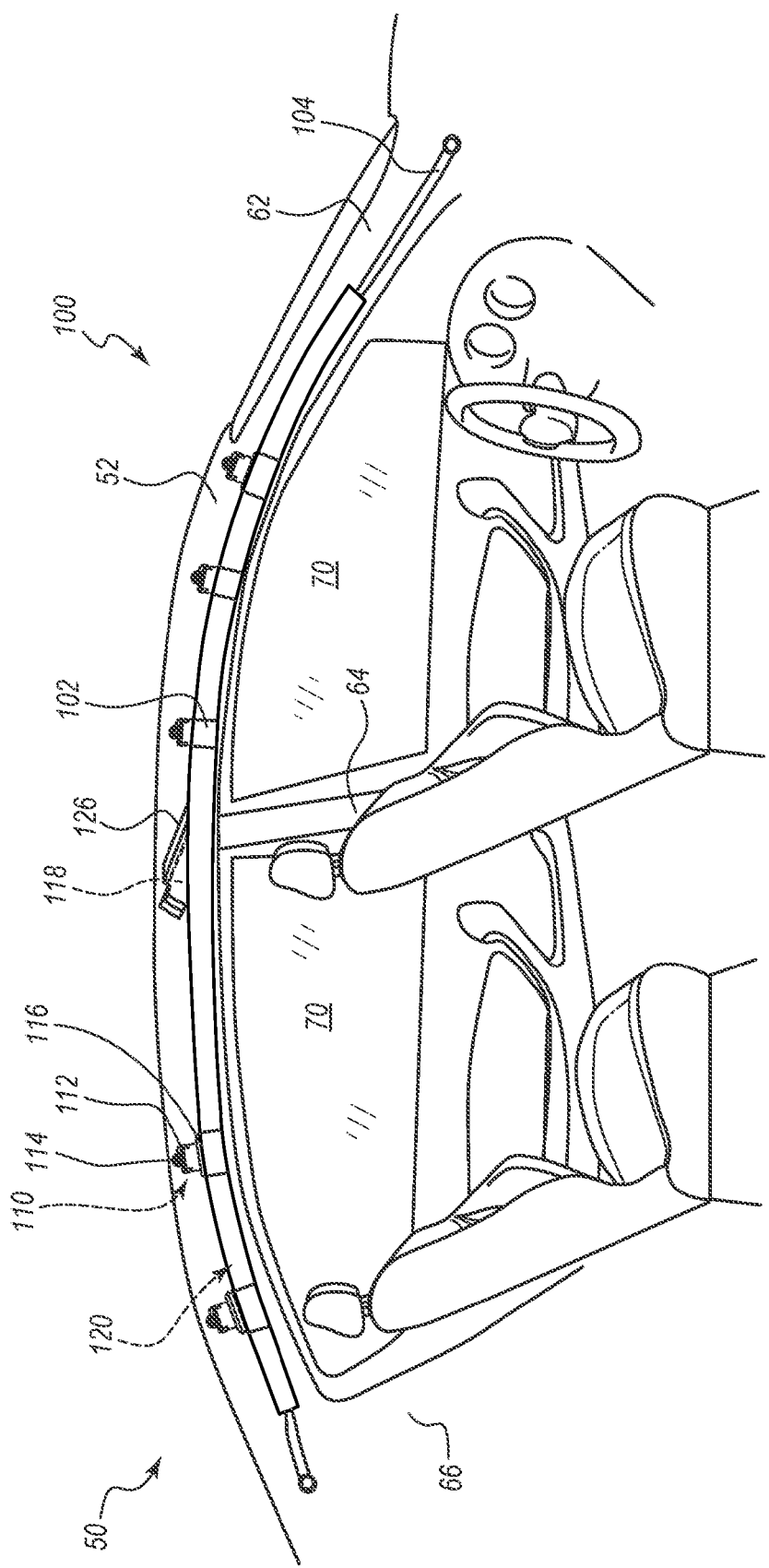
FIG. 1A is a side view of an interior of a vehicle with an inflatable curtain airbag assembly in an undeployed state.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical, fluid, and thermal interaction. Two components may be coupled to each other even though they are not in direct contact with each other.

The phrases "attached to" or "attached directly to" refer to interaction between two or more entities which are in direct contact with each other and/or are separated from each other only by a fastener of any suitable variety (e.g., mounting hardware or an adhesive).

The phrase "fluid communication" is used in its ordinary sense, and is broad enough to refer to arrangements in which a fluid (e.g., a gas or a liquid) can flow from one element to another element when the elements are in fluid communication with each other.

The terms "a" and "an" can be described as one, but not limited to one. For example, although the disclosure may recite an airbag having "a chamber," the disclosure also contemplates that the airbag can have two or more chambers.

The terms "longitudinal" and "longitudinally" refer to a direction or orientation extending or spanning between a front of a vehicle and a rear of the vehicle.

Inflatable airbag systems are widely used to reduce or minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" generally refers to an inflatable curtain airbag or cushion, although the principles discussed may apply to other airbag types in other embodiments.

Inflatable curtain airbags typically extend longitudinally within the vehicle and are usually coupled to or adjacent a roof rail of the vehicle and, when inflated, extend along the side of the vehicle between the occupant and the side panels and/or windows of the vehicle to protect an occupant (and in particular, an occupant's head) during a collision event. In an undeployed state, inflatable curtain cushions are typically rolled and/or folded, and may be retained in the undeployed configuration by being wrapped in a restraint at various attachment points at which the inflatable airbag is attached to the vehicle, or by being enclosed in a restraint, such as a sleeve or sock. The undeployed state may also be referred to as a "packaged state." In a deployed state, an inflatable curtain cushion may receive inflation gas from an inflator and expand and burst free from the restraint to cover at least a portion of the side windows and one or more pillars of the vehicle. In some embodiments, inflatable curtain cushions may cover one or more of the A-, B-, C-, and D-pillars of a vehicle (see, e.g., FIG. 1B). For example, in some embodiments, a deployed inflatable curtain airbag may extend from the A-pillar to the C-pillar of the vehicle. In other embodiments, a deployed inflatable curtain airbag may extend from the A-pillar to the D-pillar of the vehicle.

For the purposes of this disclosure, when referring to an inflatable curtain airbag, the term "above" can refer to a relative position of an area, portion, or zone of an inflatable curtain airbag that, when the inflatable curtain airbag is deployed, is at a relatively higher position with respect to the vehicle or with respect to another area, portion, or zone of the inflatable curtain airbag. For example, although a first area of an inflatable curtain airbag maybe referred to as being disposed "above" a second area of the inflatable curtain airbag, the first area may not be positioned "above" the second area when the inflatable curtain airbag is in a rolled or packaged state. Thus, the first area of the inflatable curtain airbag may be referred to as being disposed "above" the second area of the inflatable curtain airbag even though, in the packaged or undeployed state, the first area is at a position that is "below" the second area with respect to the vehicle.

Some inflatable curtain airbags may be configured to serve dual functions of cushioning and ejection prevention. During a collision event, an inflatable curtain airbag may cushion the head and upper body of an occupant. The area(s) where the occupant is likely to contact the inflatable curtain airbag during a collision may be referred to as the "occupant receiving area(s)" (see, e.g., FIG. 2). During a roll-over event, the inflatable curtain airbag may function to help retain the occupant within the vehicle. Inflatable curtain airbags can reduce or mitigate the risk of occupant ejection by forming a barrier between the occupant and the side windows.

Inflatable curtain airbags often include an inflatable cushion or cushion segment comprising one or more panels, such as fabric panels. In some embodiments, inflatable cushions can include two fabric panels which are coupled or bonded together by, for example, stitching, adhesives, or radiofrequency welding. In some other embodiments, inflatable cushions can include a single fabric body or panel, woven via a one-piece weaving technique to form one or more inflatable chambers.

Some embodiments disclosed herein can provide improved positioning, cushioning, and/or safety to occupants involved in particular types of collisions. For example, some embodiments can be particularly suited to cushion front-seat passengers seated adjacent the passenger-side door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) left oblique impact test. The conditions for the IIHS small overlap front crash test and the NHTSA oblique impact test are disclosed in the Insurance Institute for Highway Safety, *Small Overlap Frontal Crashworthiness Evaluation Crash Test Protocol* (*Version III*) (May 2014) and Saunders, J., Craig, M., and Parent, D., *Moving Deformable Barrier Test Procedure for Evaluating Small Overlap/Oblique Crashes*, SAE Int. J. Commer. Veh. 5(1):172-195 (2012), the entire contents of each of which are hereby incorporated by reference herein. These documents pertain to oblique collision events.

During an inflatable curtain airbag deployment event, some inflatable curtain airbags can cause neck compression (e.g., high neck compression) by inflating a portion of a chamber on top of a portion of an occupant's head. For example, the inflatable curtain airbag may include an upper chamber that may inflate toward a head of a vehicle occupant upon deployment of the inflatable curtain airbag. Such a configuration may apply or direct a downward force on at least a portion of the head of the occupant, which may cause or result in compression of the occupant's neck. The present disclosure is directed to inflatable curtain airbags and inflatable curtain airbag assemblies that can be configured to limit compression of a vehicle occupant's head, neck, etc.

As used herein, inboard refers to a direction toward a centerline of a vehicle and outboard refers to a direction out of the vehicle and away from a centerline of the vehicle.

Figure 1B:
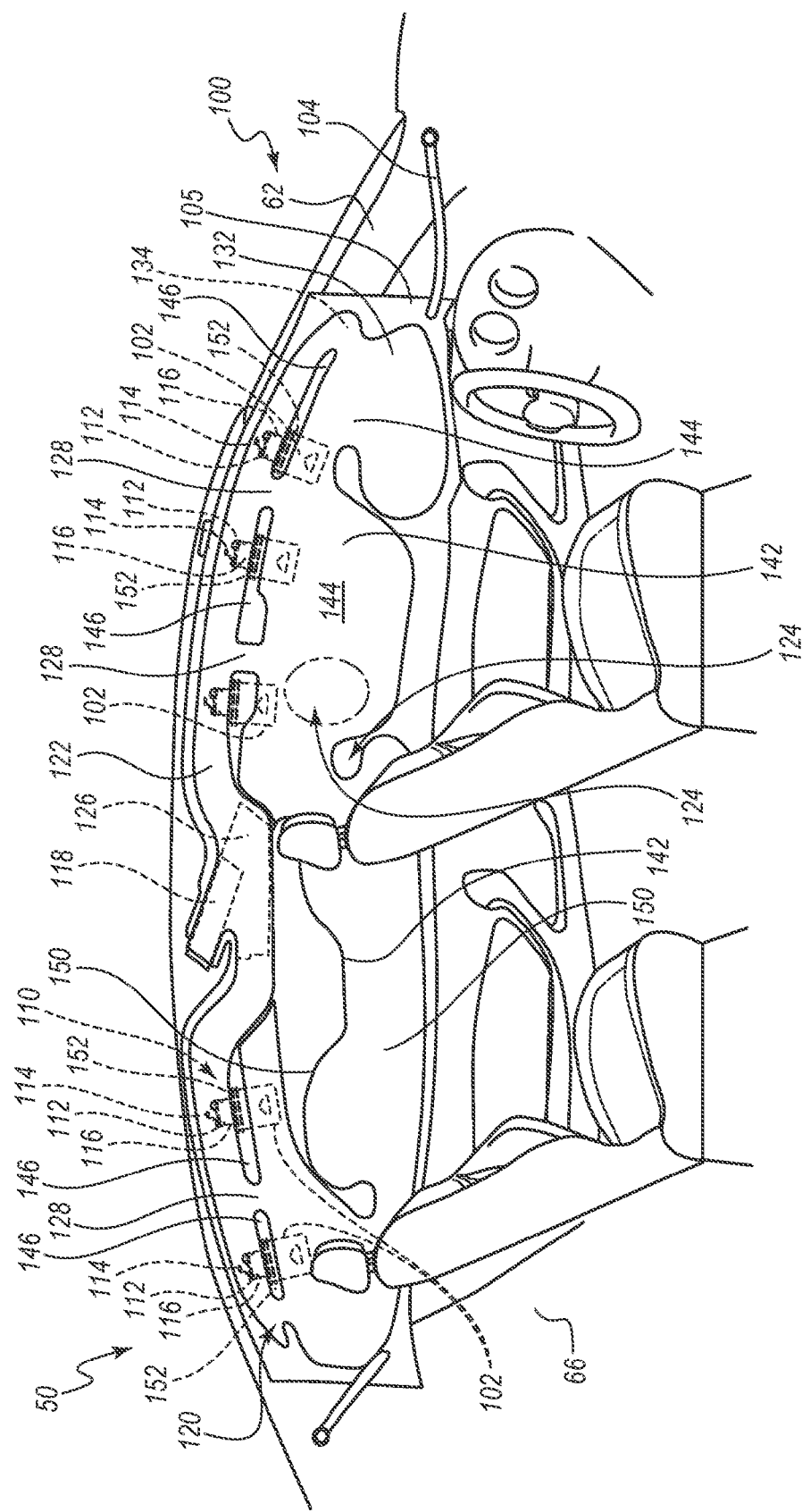
FIG. 1B is a side view of the interior of the vehicle and the inflatable curtain airbag assembly of FIG. 1A in a deployed state.

FIGS. 1A and 1B depict an inflatable airbag assembly 100 installed in a vehicle 50. With reference to FIG. 1A, the assembly 100 includes an inflatable curtain airbag 120 that is positioned at an interior of a restraint 102 (e.g., a wrapper or mini wrap) so as to be retained in a packaged configuration. The restraint 102 may be of any suitable variety, such as one or more straps, tethers, socks, or sleeves. In the illustrated embodiment, the restraint 102 includes miniwraps that hold the airbag 120 in a rolled state at tab attachment locations.

The assembly 100 can be attached to the vehicle 50 in any suitable manner. For example, in some embodiments, the assembly 100 includes one or more fastening assemblies 110 that are configured to secure one or more of the inflatable curtain airbag 120 and the restraint 102 to the vehicle 50. The assembly 100 can be mounted inside the vehicle 50 adjacent to a roof of the vehicle, such as to a roof rail 52, and above one or more windows 70. In the illustrated embodiment, each fastening assembly 110 includes a mounting tab 116 (also referred to as a mounting strap or mounting tether) that is secured to mounting hardware, such as a mounting bracket 112 that is to be secured to the roof rail 52 via a fastener 114, such as a bolt or clip. Any other suitable fastening arrangement is also contemplated. Each mounting tab 116 may be coupled with one or more of the inflatable curtain airbag 120 and the restraint 102 in any suitable manner.

A forward end or portion 105 of the assembly 100 can include a strap 104, which may be secured to the vehicle 50 in any suitable manner. For example, in the illustrated embodiment, the strap 104 is attached to a lower end of an A-pillar 62. As shown in FIG. 1B, the strap 104 can be attached to a forward end 105 of the inflatable curtain airbag 120.

With continued reference to FIG. 1A, the inflatable curtain airbag assembly 100 can further include an inflator 118, which may be positioned within a throat 126 of the inflatable curtain airbag 120. The inflator 118 can be anchored to the roof rail 52, and may be of any suitable variety. In some embodiments, the inflator 118 includes either a pyrotechnic device or a stored gas inflator. The inflator 118 can be in electronic communication with vehicle sensors which are configured to detect vehicle collisions and/or rollovers. Upon detection of predetermined conditions, the sensors can activate the inflator 118 and the inflatable curtain airbag 120 may be rapidly inflated.

FIG. 1B depicts the inflatable airbag assembly of FIG. 1A in a deployed configuration. When deployed, the inflatable curtain airbag 120 is configured to cover various structures of the vehicle 50. For example, in some embodiments, at least a portion of the deployed inflatable curtain airbag 120 can cover one or more of an A-pillar 62, a B-pillar 64, and a C-pillar 66, and/or one or more side windows 70. The illustrated embodiment is configured to cover the B-pillar 64, and each of the windows 70. With continued reference to FIG. 1B, the inflatable curtain airbag 120 can include various inflatable chambers configured to receive, direct, and/or retain inflation gas from the inflator 118. Some of the inflatable chambers are cushion segments 142 that are configured to be filled with inflation gases to cushion a vehicle occupant during a collision event. The cushion segments 142 can be configured to deploy at strategic areas at which a vehicle occupant may benefit most from the cushioning, such as occupant receiving area(s) 124. In the illustrated embodiment, the cushion segments 142 are in fluid communication with the throat 126 of the inflatable curtain airbag 120. In some embodiments, inflation gases may be retained within a given cushion segment 142 to maintain the cushion segment 142 in an inflated or filled configuration, even when a vehicle occupant presses against the cushion segment 142. Such an arrangement can allow the cushion segment 142 to provide a desired amount of protection to the vehicle occupant. In some embodiments, the one or more cushion segments 142 may be formed from one or more panels, wherein the one or more panels may comprise fabric or another suitable material. In certain embodiments, an upper edge of the cushion segment 142 may comprise a selvage area of the fabric (e.g., an edge area or portion configured to prevent unraveling of the fabric).

In some embodiments, the inflatable curtain airbag 120 can include one or more non-inflatable regions 144. One or more of the non-inflatable regions 144 may be positioned between adjacent cushion segments 142 or at an interior of a cushion segment 142 (e.g., so as to be encompassed by a cushion segment 142).

In various embodiments, at least a portion of one or more of the cushion segments 142 and the non-inflatable regions 144 can be defined by one or more boundary seams 150. The one or more boundary seams 150 may be formed in any suitable manner. For example, in some embodiments, the one or more boundary seams 150 may include one or more of stitches, welds (e.g., radiofrequency welds), and/or adhesives. In other or further embodiments, the boundary seams 150 may be woven portions that are formed via one-piece weaving techniques. As further discussed below, in some embodiments, the boundary seams 150 may join together two or more pieces of fabric, such as an inboard face or panel 132 and an outboard face or panel 134. In some embodiments, the one or more boundary seams 150 are substantially airtight so as to be able to retain inflation gas within a given cushion segment 142. The one or more boundary seams 150 can be said to fluidly isolate adjacent cushion segments 142 from each other. In other embodiments, the one or more boundary seams 150 may not be airtight, but may instead resist egress of gases from the cushion segment 142.

The shapes of the inflatable curtain airbag 120 and its various components, such as the cushion segments 142, that are depicted in FIG. 1B are not necessarily limiting. These shapes may be altered, such as to accommodate differently shaped vehicles. In some embodiments, the inflated inflatable curtain airbag 120 is configured to fit within the side window wells of the vehicle 50. The inflatable curtain airbag 120 may include a contiguous piece of material manufactured using a one-piece woven technique, in some embodiments, or in other or further embodiments, may be manufactured by cutting and sewing separate pieces of material (e.g., nylon fabric) together. For example, the inboard and outboard faces 132, 134 may be formed from separate panels or sheets of material that are joined together. In other embodiments, the inboard and outboard faces 132, 134 may be formed from a unitary piece of material.

Referring again to the embodiment of FIG. 1B, the inflatable curtain airbag 120 can include a top fill tube or fill tube portion 122 which can be displaced, offset, or separated from the one or more cushion segments 142 by one or more upper zero-thickness zones 146, one or more conduits 128, one or more non-inflatable regions 144, and/or one or more boundary seams 150. In various embodiments, such a displacement, offset, or separation can define or form an intervening space, wherein the intervening space is disposed between the top fill tube 122 and the one or more cushion segments 142. While the top fill tube 122 can be displaced, offset, or separated from the one or more cushion segments 142 (e.g., by the intervening space), the one or more conduits 128 couple the top fill tube 122 to the one or more cushion segments 142. Each conduit 128 provides fluid communication between the top fill tube 122 and a cushion segment 142. A conduit 128 may comprise an aperture, channel, or opening (i.e., that is surrounded by or otherwise formed by one or more boundary seams).

In some embodiments, a conduit 128 may be disposed between two upper zero-thickness zones 146. The upper zero-thickness zones 146 and conduits 128 can extend along an upper border, edge, or portion of the cushion segments 142. The top fill tube 122 is in fluid communication with the throat 126 and can be configured to receive inflation gas from the inflator 118. The top fill tube 122 can extend longitudinally along at least a portion of the inflatable curtain airbag 120 and can be separated from the cushion segments 142 by the upper zero-thickness zones 146. In the illustrated embodiment, each of the upper zero-thickness zones 146 can be disposed, located, or positioned above the one or more occupant receiving areas 124. The upper zero-thickness zones 146 may be formed or defined by one or more boundary seams 150. In some embodiments, the upper zero-thickness zones 146 may not be inflatable. In certain embodiments, the upper zero-thickness zones 146 may comprise an aperture, an opening, or a window that is disposed through the inflatable curtain airbag 120. (For example, one or more of the upper zero-thickness zones 146 can include an opening or window through the each of the inboard face 132 and the outboard face 134 of the inflatable curtain airbag 120).

The inflatable curtain airbag 120 can further include the plurality of conduits 128, wherein the conduits 128 can provide or are configured to provide fluid communication between the top fill tube 122 and the cushion segments 142, as discussed above. During deployment of the inflatable curtain airbag 120, inflation gas provided by the inflator 118 can flow or pass through the throat 126 and into the top fill tube 122. The inflation gas can then flow from the top fill tube 122 into the one or more cushion segments 142 via the one or more conduits 128 (e.g., around or adjacent the one or more upper zero-thickness zones 146). By directing the inflation gas into the cushion segments 142 through or via the conduits 128, the inflatable curtain airbag 120 may be less likely to inflate one or more chambers or cushion segments 142 such that the one or more chambers or cushion segments 142 apply or direct a compressive force to an occupant's head and/or neck. Accordingly, by directing the inflation gas into the cushion segments 142 through the conduits 128, deployment of the inflatable curtain airbag 120 is less likely to cause or result in neck compression of the occupant.

With continued reference to FIG. 1B, the inflatable curtain airbag 120 can be coupled or secured to the vehicle 50 by the plurality of mounting tabs 116. Each of mounting tabs 116 can be attached or coupled to the inflatable curtain airbag 120 at an attachment area 152. As depicted, the inflatable curtain airbag 120 can include a plurality of mounting tabs 116 and a plurality of attachment areas 152. In the illustrated embodiment, the attachment areas 152 are disposed at or adjacent the upper zero-thickness zones 146. As discussed above, the upper zero-thickness zones 146 can be disposed at positions along and/or below the top fill tube 122.

The attachment areas 152 can also be described as being disposed at, along, or adjacent the upper edge or portion of the plurality of cushion segments 142. The mounting tabs 116 can be secured to the vehicle at the roof rail 52 directly or by mounting brackets 112 and/or fasteners 114. In the illustrated embodiment, the arrangement used to secure the inflatable curtain airbag 120 to the vehicle can dispose or position the top fill tube 122 above the attachment areas 152 during and/or upon deployment on the inflatable curtain airbag 120. Accordingly, the top fill tube 122 may be disposed or positioned above the occupant receiving areas 124 during and/or upon deployment of the inflatable curtain airbag 120 such that the occupant receiving areas 124 are disposed on the cushion segments 142. In some embodiments, the upper edge of the cushion may be oriented along a longitudinal axis of the cushion or cushion segments 142. Furthermore, the upper edge can include the one or more attachment areas 152 at which a mounting device (such as the fastening assembly 110 including the mounting tab 116, the mounting bracket 112, and/or the fastener 114) is to be attached.

Figure 2:
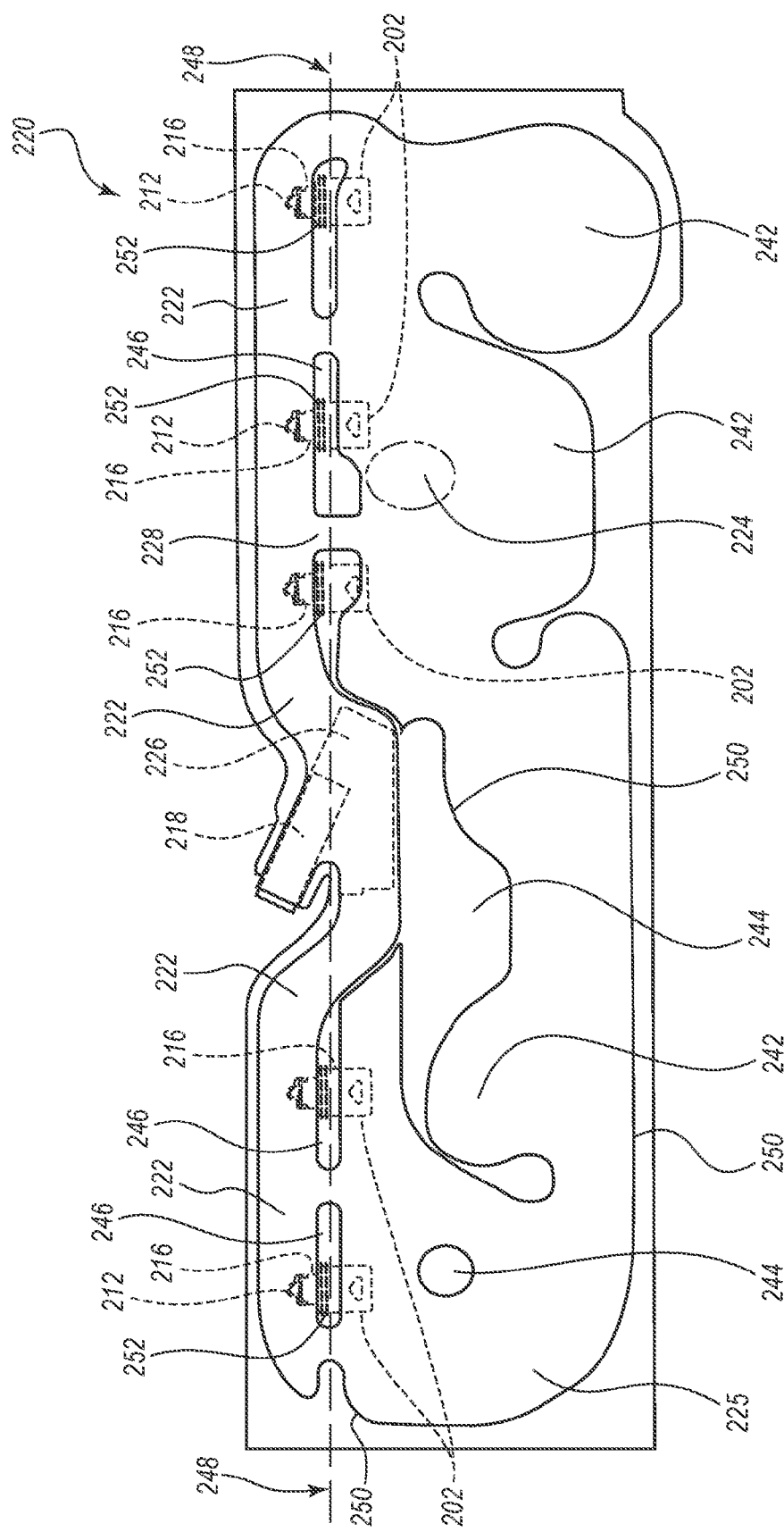
FIG. 2 is a top plan view of an inflatable curtain airbag, according to one embodiment, shown prior to installation and packaging.

FIG. 2 is a side view of an inflatable curtain airbag 220 that can resemble the inflatable curtain airbag 120 described above in certain respects. Accordingly, like features are designated with like reference numerals, with the leading digits incremented to "2." Relevant disclosure set forth above regarding similarly identified features thus may not be repeated hereafter. Moreover, specific features of the inflatable curtain airbag 220 may not be shown or identified by a reference numeral in the drawings or specifically discussed in the written description that follows. However, such features may be the same, or substantially the same, as features depicted in other embodiments and/or described with respect to such embodiments. Accordingly, the relevant descriptions of such features apply equally to the features of the inflatable curtain airbag 220. Any suitable combination of the features and variations of the same described with respect to the inflatable curtain airbag 120 can be employed with the inflatable curtain airbag 220, and vice versa. This pattern of disclosure applies equally to further embodiments depicted in subsequent figures and described hereafter, wherein the leading digits may be further incremented.

The inflatable curtain airbag 220 of FIG. 2 is shown in an unfolded configuration, for example, prior to packaging and/or installing the inflatable airbag 220 in a vehicle. The inflatable curtain airbag 220 includes a top fill tube 222, upper zero-thickness zones 246, cushion segments 242, attachment areas 252, and mounting tabs 216 (or mounting strap). Restraints 202 can be coupled to the inflatable curtain airbag 220 to secure it in a packaged configuration. As illustrated, the mounting tabs 216 can be attached or coupled to a mounting bracket 212 and to the inflatable curtain airbag 220 at the attachment areas 252. In some embodiments, a mounting tab 216 can be coupled to an attachment area 252 by aligning the mounting tab 216 with the attachment area 252. The mounting tab 216 can then be coupled to the attachment area 252 (e.g., upon alignment of the mounting tab 216 and the attachment area 252) by stitching the mounting tab 216 and the attachment area 252 together. For example, a stitching element (e.g., a thread, a yarn, etc.) can be disposed or passed through each of a portion of the attachment area 252 and a portion of the mounting tab 216. In various embodiments, the inflatable curtain airbag 220 may be folded along at least a portion of an upper edge 248 prior to coupling the mounting tabs 216 to the inflatable curtain airbag 220. In certain embodiments, the inflatable curtain airbag 220 may be folded at or adjacent one or more of the upper zero-thickness zones 246 prior to coupling the mounting tabs 216 to the inflatable curtain airbag 220.

In some embodiments, the upper edge 248 can extend longitudinally along at least a portion of the upper edges or portions of the one or more cushion segments 242 and/or a front chamber 225. As illustrated, the upper edge 248 is not an upper edge or boundary of the inflatable curtain airbag 220 (i.e., the upper edge or boundary disposed above the top fill tube 222) when the inflatable curtain airbag 220 is in the deployed state. Stated another way, the upper edge 248 can be disposed and/or extend between a lower edge or portion of the top fill tube 222 and the upper edges or portions of the one or more cushion segments 248 and/or the front chamber 225.

As described in further detail below, the upper edge 248 can be described as being disposed above each of the top fill tube 222, the one or more cushion segments 248, and/or the front chamber 225 when the top fill tube 222 is folded and/or rotated about the upper edge of the one or more cushion segments 248 and/or the front chamber 225 relative to the one or more cushion segments 248 and/or the front chamber 225. For example, when the top fill tube 222 is rotated inward toward an inboard side or outward toward an outboard side of the one or more cushion segments 248 and/or the front chamber 225 the upper edge 248 may be described as being disposed above each of the top fill tube 222, the one or more cushion segments 248, and/or the front chamber 225.

As depicted, the inflatable curtain airbag 220 may include a front chamber or front chamber portion 225 disposed in a forward or front portion of the inflatable curtain airbag 220. In some embodiments, the top fill tube 222 of the inflatable curtain airbag 220 can be configured to direct an inflation gas to the front chamber 225 of the inflatable curtain airbag 220. The top fill tube 222 can also be configured to direct the inflation gas to the other cushion segments 242 (e.g., the cushion segments 242 disposed rearward of the front chamber 225). The top fill tube 222 can be configured to direct the inflation gas to the front chamber 225 such that the front chamber 225 can inflate prior to or more rapidly than the other cushion segments 242 or prior to or more rapidly than other portions of the inflatable curtain airbag 220 (e.g., a delayed chamber portion or portions disposed rearward of the front chamber 225). Accordingly, the front chamber 225 may inflate and be disposed in a desired position (e.g., below a window line) before the vehicle moves laterally in a collision event such as an oblique collision event. Such a configuration may enhance or improve occupant protection during an oblique collision event and may prevent the curtain airbag 220 from deploying outside the window.

In an oblique collision event, an occupant may travel in a forward direction (i.e., toward the front of the vehicle) before the occupant travels in a lateral direction relative to a direction of travel of the vehicle. The occupant may also, or alternatively, travel in the forward direction at a faster rate than the occupant travels in the lateral direction during the oblique collision event. By directing the inflation gas to inflate the front chamber 225 prior to or more rapidly than one or more of the cushion segments 242, the inflatable curtain airbag 220 can be inflated and in position to receive the occupant during and/or after the oblique collision event. Similarly, by directing the inflation gas to inflate the front chamber 225 more quickly than the one or more other cushion segments 242, the top fill tube 222 may provide enhanced or improved occupant protection in the small overlap impact condition. Oblique collision timing is different than side impact timing and a primary challenge is making sure the front chamber 225 is in position before the vehicle moves laterally so the curtain airbag doesn't deploy out the window.

Figure 3B:
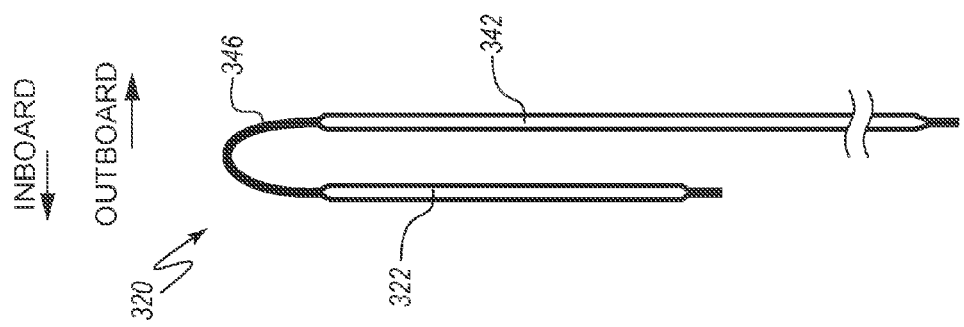
FIG. 3B is a cross-sectional view of the inflatable curtain airbag of FIG. 3A with the top fill tube folded inboard.
Figure 3A:
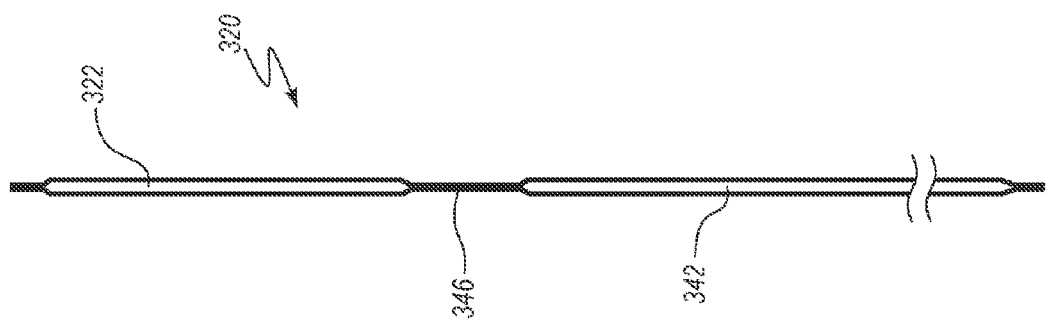
FIG. 3A is a cross-sectional view of an inflatable curtain airbag, according to one embodiment.

FIGS. 3A-3E are cross-sectional views illustrating an inflatable curtain airbag 320, according to one embodiment, prior to, during, and upon packaging of the inflatable curtain airbag 320. FIG. 3A is a cross-sectional view of the inflatable curtain airbag 320 prior to folding of a top fill tube 322, attaching any fastening assembly to the zero-thickness zone 346, and rolling a cushion segment 342.

FIG. 3B is a cross-sectional view of the inflatable curtain airbag 320 with the top fill tube 322 folded inboard at the zero-thickness zone 346.

FIG. 3C is a cross-sectional view of the inflatable curtain airbag 322 shown during packaging and illustrating the attachment of a mounting tab 316 and a restraint 302 (or miniwrap) to the zero-thickness zone 346. The mounting tab 316 can be attached or coupled to the inflatable curtain airbag 320 via stitching 354 or another suitable attachment mechanism. The stitching 354 can pass through at least a portion of an attachment area of an upper zero-thickness zone 346. The mounting tab 316 can also be coupled to a mounting bracket 312 to be secured to the vehicle by a fastener.

FIG. 3D is a cross-sectional view of the inflatable curtain airbag 320 shown as being rolled outboard during packaging. FIG. 3D depicts the inflatable curtain airbag 320 in a partially packaged configuration. In the partially packaged configuration, the inflatable curtain airbag 320 may be rolled on an outboard side of the inflatable curtain airbag 320 from a bottom portion of the inflatable curtain airbag 320 toward the top fill tube 322.

Figure 3E:
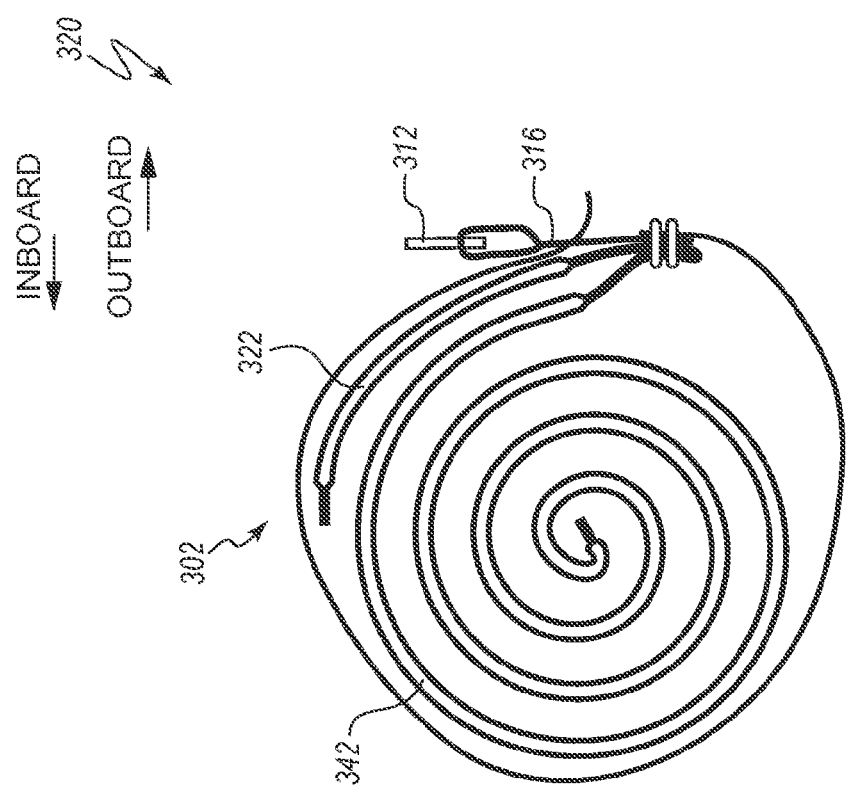
FIG. 3E is a cross-sectional view of the inflatable curtain airbag of FIG. 3A, shown in a packaged configuration.

FIG. 3E is a cross-sectional view of the inflatable curtain airbag of FIG. 3A, shown in a packaged configuration. FIG. 3E depicts the inflatable curtain airbag 320 in a fully or substantially fully packaged configuration. In the fully packaged configuration, the top fill tube 322 may be rolled around at least a portion of the rolled bottom portion and/or the rolled cushion segments 342 of the inflatable curtain airbag 320. The fully-rolled inflatable curtain airbag 320 can be secured in a rolled state within a restraint 302, wherein the restraint 302 may cover at least a portion or all of the fully-rolled inflatable curtain airbag 320. In certain embodiments, the restraint 302 may be coupled to and/or extend from the mounting tab 316. In certain other embodiments, the restraint 302 may be coupled to and/or extend from a fastening assembly. In the illustrated embodiment, at least a portion of the mounting tab 316 is uncovered such that the mounting tab 316 can be coupled to a mounting bracket 312 to be secured by a fastener to a vehicle, such that the mounting tab 316 may couple the inflatable curtain airbag 320 to the vehicle.

Figure 4A:
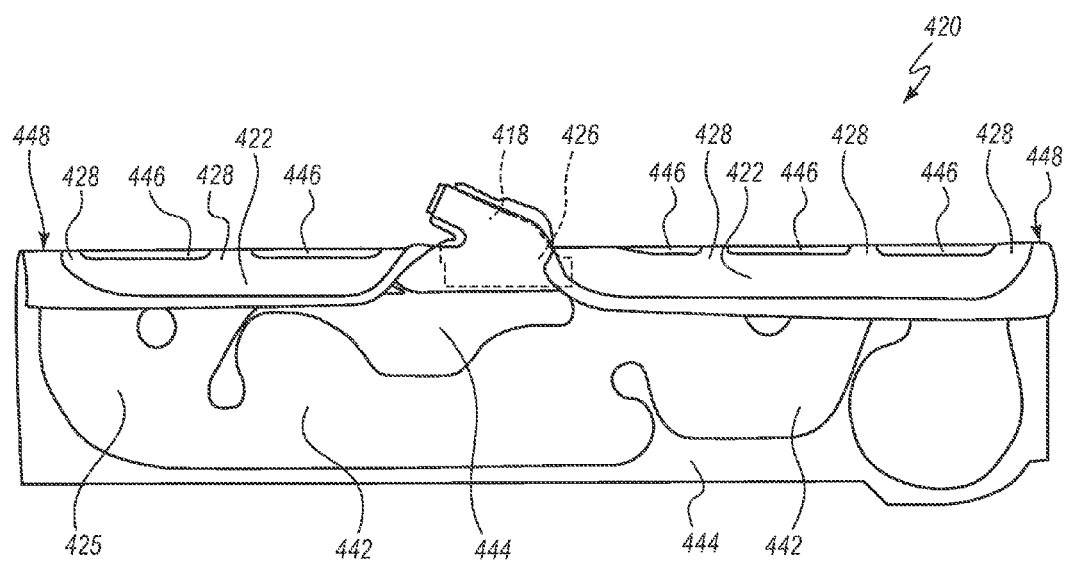
FIG. 4A is a side view of an inflatable curtain airbag, according to one embodiment, shown prior to packaging, with a top fill tube folded in an inboard direction to form an upper edge.
Figure 4B:
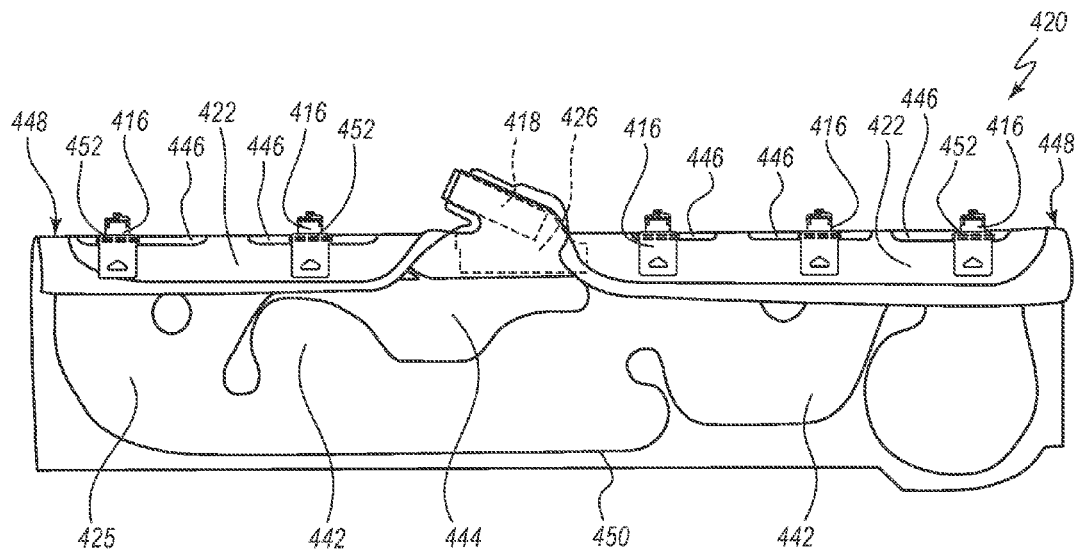
FIG. 4B is a side view of the inflatable curtain airbag of FIG. 4A, shown during packaging and illustrating the attachment of a plurality of mounting tabs along a top edge of the inflatable curtain airbag.

FIGS. 4A and 4B are side views of an inflatable curtain airbag 420 during different stages and/or steps of packaging the inflatable curtain airbag 420. With reference to FIG. 4A, a top fill tube 422 of the inflatable curtain airbag 420 can be rotated or folded in an inboard direction along an upper edge 448 of one or more of the cushion segments 442. As shown, the upper edge 448 can extend along or adjacent the upper zero-thickness zones 446 and conduits 428, such that a crease or fold forms and/or extends along at least a portion of the upper edge 448. FIG. 4B depicts the inflatable curtain airbag 420 at a later stage of packaging. In various embodiments, a plurality of mounting tabs 416 can be coupled to the inflatable curtain airbag 420, for example, at attachment areas 452 that are located at or adjacent the upper edge 448. The mounting tabs 416 may be attached or coupled to the inflatable curtain airbag 420 by stitching through two layers of the folded attachment area 452 and the mounting tabs 416. In various embodiments, the mounting tabs 416 may be attached or coupled to the inflatable curtain airbag 420 by adhesives, welding (e.g., radiofrequency welding), or another suitable attachment mechanism.

By attaching or coupling the mounting tabs 416 to the inflatable curtain airbag 420 at or adjacent the attachment areas 452 while the inflatable curtain airbag 420 is folded, the top fill tube 422 may be biased, disposed, or folded in an inboard or outboard direction relative to the cushion segments 442.

Figure 5D:
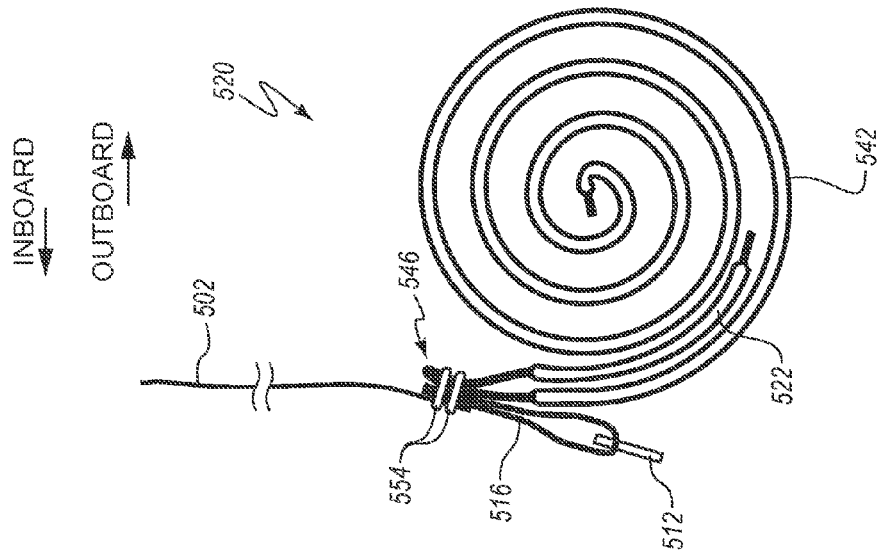
FIG. 5D is a cross-sectional view of the inflatable curtain airbag of FIG. 5A shown as being rolled outboard during packaging.

FIGS. 5A-5E are cross-sectional views illustrating an inflatable curtain airbag 520, according to one embodiment, prior to, during, and upon packaging of the inflatable curtain airbag 520. FIG. 5A is a cross-sectional view of the inflatable curtain airbag 520 prior to folding of a top fill tube 522, attaching any fastening assembly to the zero-thickness zone 546, and rolling a cushion segment 542.

FIG. 5B is a cross-sectional view of the inflatable curtain airbag 520 with the top fill tube 522 folded outboard at the zero-thickness zone 546.

Figure 5C:
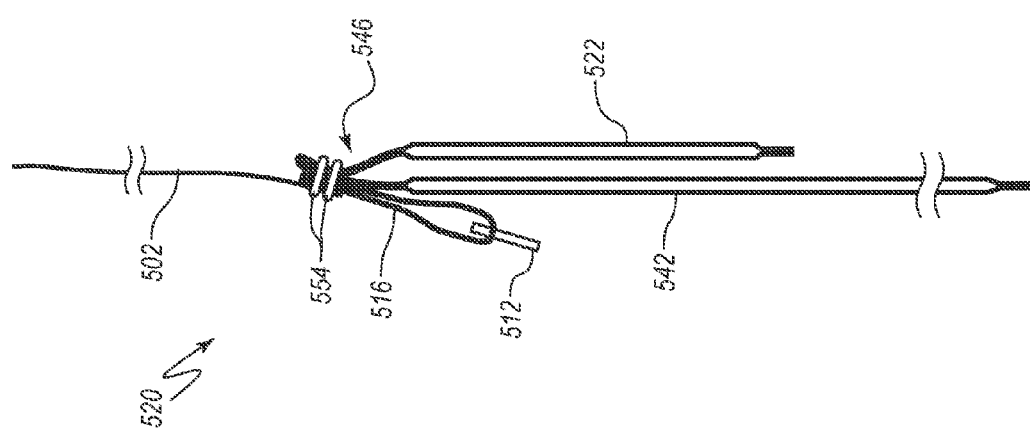
FIG. 5C is a cross-sectional view of the inflatable curtain airbag of FIG. 5A shown during packaging and illustrating the attachment of a mounting tab to an attachment area of the inflatable curtain airbag.

FIG. 5C is a cross-sectional view of the inflatable curtain airbag 522 shown during packaging and illustrating the attachment of a mounting tab 516 and a restraint 502 (or miniwrap) to the zero-thickness zone 546. The mounting tab 516 can be attached or coupled to the inflatable curtain airbag 520 via stitching 554 or another suitable attachment mechanism. The stitching 554 can pass through at least a portion of an attachment area of an upper zero-thickness zone 546. The mounting tab 516 can also be coupled to a mounting bracket 512 to be secured to the vehicle by a fastener.

FIG. 5D is a cross-sectional view of the inflatable curtain airbag 520 shown as being rolled outboard during packaging. FIG. 5D depicts the inflatable curtain airbag 520 in a partially packaged configuration. In the partially packaged configuration, the inflatable curtain airbag 520 may be rolled on an outboard side of the inflatable curtain airbag 520 from a bottom portion of the inflatable curtain airbag 520 toward the top fill tube 522.

FIG. 5E is a cross-sectional view of the inflatable curtain airbag of FIG. 5A, shown in a packaged configuration. FIG. 5E depicts the inflatable curtain airbag 520 in a fully packaged configuration (or substantially fully packaged configuration). In the fully packaged configuration of FIG. 5E, the top fill tube 522 may be rolled around at least a portion of the rolled bottom portion and/or the rolled cushion segments 542 of the inflatable curtain airbag 520. The fully-rolled inflatable curtain airbag 520 can be secured in a rolled state within a restraint 502. In certain embodiments, the restraint 502 may be coupled to and/or extend from a fastening assembly. In the illustrated embodiment, the mounting tab 516 is coupled to a mounting bracket 512 to be secured at a fastener to the vehicle, such that the mounting tab 516 can be coupled to a vehicle and/or such that the mounting tab 516 may couple the inflatable curtain airbag 520 to the vehicle.

Figure 6:
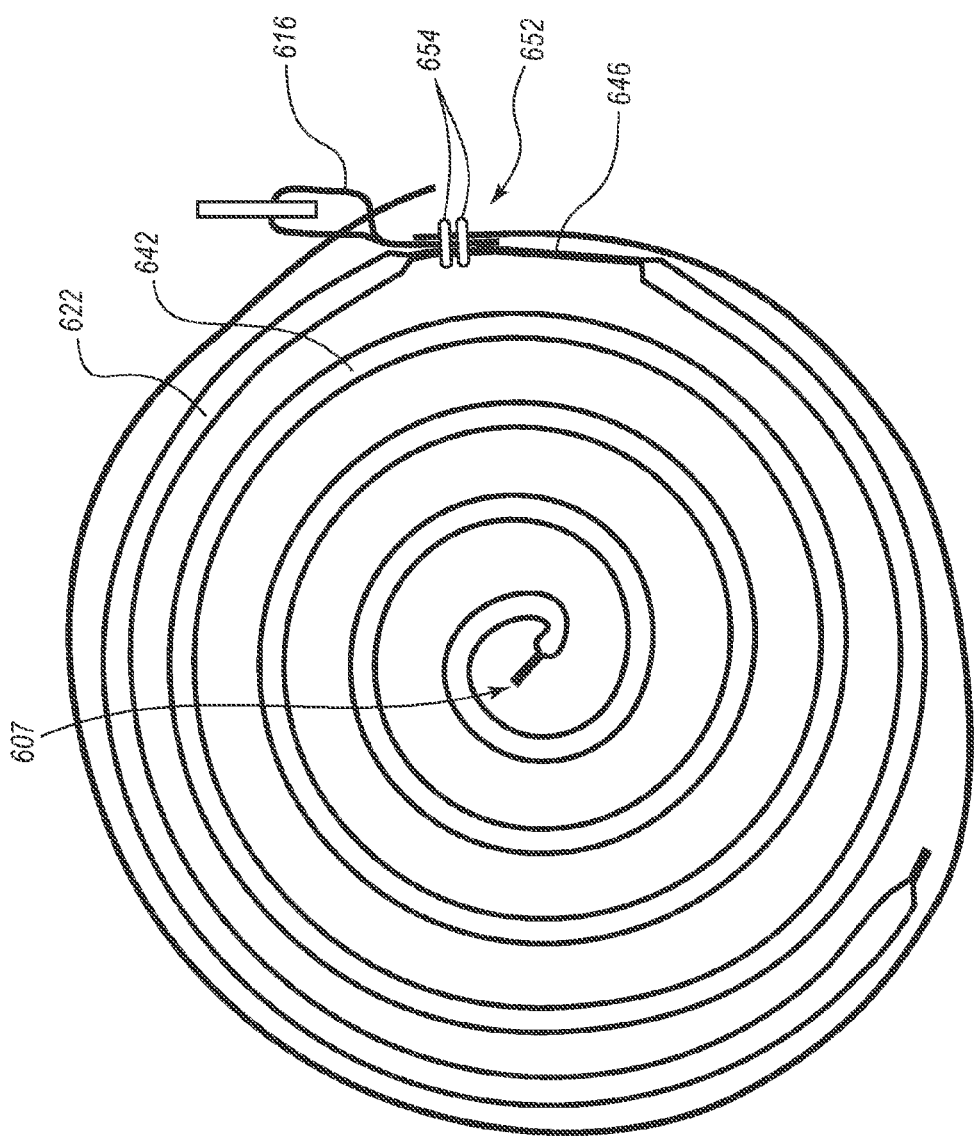
FIG. 6 is a cross-sectional view of an inflatable curtain airbag, according to one embodiment, shown in a packaged configuration with a top fill tube left unfolded prior to packaging.

FIG. 6 is a cross-sectional view of an inflatable curtain airbag 620 including a top fill tube 622, wherein the top fill tube 622 is not folded relative to a cushion segment 642, before attachment of a fastening assembly at an attachment area 652. In other embodiments, the attachment area 652 may not be located at or adjacent the upper zero-thickness zones 646. For example, the attachment area 652 may be disposed at or adjacent to the upper edge of the cushion segment 642 of the inflatable curtain airbag 620. In some other embodiments, the upper zero-thickness zones 646 may have a width, a height, and/or a length that is less than the width, the height, and/or the length of the upper zero-thickness zones 646 illustrated in FIGS. 1B-5. In some other embodiments, an upper zero-thickness zone may include a line of stitching, such as a boundary seam.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable curtain airbag for use in a vehicle, the inflatable curtain airbag comprising:
    a cushion formed from one or more panels defining an inflatable chamber to receive inflation gas and expand to deploy the inflatable curtain airbag from a packaged state to a deployed state, the cushion to be positioned in the deployed state between an occupant of the vehicle and a window of the vehicle to receive the occupant in a side-impact collision, the one or more panels forming an upper edge of the cushion, the upper edge oriented along a longitudinal axis of the cushion and including an attachment area at which a mounting device is to be attached;
    a top fill tube formed from the one or more panels, the top fill tube to be in fluid communication with and to direct inflation gas of an inflator, the top fill tube extending along the upper edge of the cushion and separated from the upper edge of the cushion by an intervening space, and the top fill tube disposed external to and separated from the inflatable chamber by the intervening space; and
    a conduit in fluid communication with the top fill tube and the inflatable chamber to communicate inflation gas from the top fill tube to the inflatable chamber.

2. The inflatable curtain airbag of claim 1, further comprising a throat portion to be in fluid communication with and receive inflation gas from the inflator, wherein the top fill tube receives inflation gas from the throat portion.

3. The inflatable curtain airbag of claim 1, wherein the one or more panels comprise fabric and the upper edge of the cushion comprises a selvage area of the fabric.

4. The inflatable curtain airbag of claim 3, wherein the one or more panels are formed by a one-piece weaving technique.

5. The inflatable curtain airbag of claim 1, further comprising mounting tabs coupled to the attachment area of the upper edge of the cushion.

6. The inflatable curtain airbag of claim 5, wherein the mounting tabs are affixed at the attachment area by stitching.

7. The inflatable curtain airbag of claim 5, wherein the top fill tube is rotated about the upper edge of the cushion relative to the cushion prior to coupling the mounting tabs to the attachment area.

8. The inflatable curtain airbag of claim 7, wherein the top fill tube is rotated inward toward an inboard side of the cushion.

9. The inflatable curtain airbag of claim 7, wherein the top fill tube is rotated outward toward an outboard side of the cushion.

10. The inflatable curtain airbag of claim 5, wherein the top fill tube is to be rotated about the upper edge of the cushion relative to the cushion after coupling the mounting tabs to the attachment area.

11. The inflatable curtain airbag of claim 1, wherein the top fill tube and the conduit direct inflation gas to flow into the inflatable chamber at an area distal of an occupant receiving area of the cushion of the inflatable curtain airbag.

12. The inflatable curtain airbag of claim 1, the cushion comprising a front chamber disposed at a front portion of the inflatable curtain airbag, and a delayed chamber portion disposed rearward of the front chamber, the top fill tube configured to direct the inflation gas to inflate the front chamber at a faster rate than the delayed chamber portion.

13. An inflatable curtain airbag assembly for use in a vehicle, the inflatable curtain airbag assembly comprising:
   an inflator;
   an inflatable curtain airbag having a longitudinal orientation to extend along a side of a vehicle, the inflatable curtain airbag comprising;
      one or more chambers formed by one or more panels, the one or more chambers to receive inflation gas from the inflator during deployment of the inflatable curtain airbag and to expand from a packaged state to a deployed state, the one or more chambers in the deployed state to be positioned between an occupant of the vehicle and a window of the vehicle in a side-impact collision, the one or more chambers defining an upper edge of the inflatable curtain airbag;
      a throat portion configured to be coupled in fluid communication with and receive inflation gas from the inflator;
      a top fill tube in fluid communication with the throat portion to receive inflation gas from the throat portion, the top fill tube extending longitudinally along the upper edge formed by the one or more chambers and separated from the upper edge by an intervening space, the upper edge including an attachment area; and
      one or more conduits in fluid communication with the top fill tube and the one or more chambers, the one or more conduits to communicate the inflation gas from the top fill tube to the one or more chambers.

14. The inflatable curtain airbag assembly of claim 13, wherein the top fill tube is configured to be rotated about the upper edge of the inflatable curtain airbag to couple one or more mounting tabs to the attachment area.

15. The inflatable curtain airbag assembly of claim 14, wherein the top fill tube is rotated inward toward an inboard side of the inflatable curtain airbag.

16. The inflatable curtain airbag assembly of claim 14, wherein the top fill tube is rotated outward toward an outboard side of the inflatable curtain airbag.

17. The inflatable curtain airbag assembly of claim 13, wherein the top fill tube and the conduit direct inflation gas to vent into the one or more chambers in an area of the one or more chambers that is disposed away from an occupant receiving area of the inflatable curtain airbag.

18. An inflatable curtain airbag for use in a vehicle, the inflatable curtain airbag comprising:
   a cushion area including:
      an inflatable chamber to receive inflation gas and expand to deploy the inflatable curtain airbag from a packaged state to a deployed state, the cushion area to be positioned, in the deployed state, between an occupant of the vehicle and a window of the vehicle to receive the occupant in a side-impact collision;
      a front chamber disposed in a front portion of the inflatable curtain airbag; and
      one or more chamber portions disposed rearward of the front chamber;
   one or more upper zero-thickness zones defining an upper edge of the cushion area;
   a fill tube portion to be in fluid communication with and to direct inflation gas from an inflator, the fill tube portion extending along the one or more upper zero-thickness zones external to the inflatable chamber of the cushion area, and the fill tube portion configured to direct the inflation gas to inflate the front chamber at a faster rate than the one or more chamber portions;
   a conduit extending between the fill tube portion and the inflatable chamber of the cushion area to communicate inflation gas from the fill tube portion to the inflatable chamber; and
   one or more mounting tabs secured to the one or more upper zero-thickness zones.

19. The inflatable curtain airbag of claim 18, wherein the conduit extends adjacent to and provides fluid communication around the one or more upper zero-thickness zones.

20. The inflatable curtain airbag of claim 18, further comprising a throat portion to be in fluid communication with and receive inflation gas from the inflator, wherein the fill tube portion receives inflation gas from the throat portion, and wherein the fill tube portion is rotated inward toward an inboard side of the cushion area.

21. The inflatable curtain airbag of claim 18, further comprising a throat portion to be in fluid communication with and receive inflation gas from the inflator, wherein the fill tube portion receives inflation gas from the throat portion, and wherein the fill tube portion is rotated outward toward an outboard side of the cushion area.

22. The inflatable curtain airbag of claim 18, wherein the fill tube portion and the conduit direct inflation gas to vent into the inflatable chamber in an area of the inflatable chamber disposed away from an occupant receiving area of the cushion area of the inflatable curtain airbag.

* * * * *